(12) United States Patent
Kitagawa

(10) Patent No.: US 12,261,674 B2
(45) Date of Patent: Mar. 25, 2025

(54) MOBILE RELAY STATION, MOBILE COMMUNICATION SYSTEM, AND CONTROL METHOD OF MOBILE RELAY STATION

(71) Applicant: Sumitomo Electric Industries, Ltd., Osaka (JP)

(72) Inventor: Koichiro Kitagawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 286 days.

(21) Appl. No.: 17/790,126

(22) PCT Filed: Oct. 19, 2020

(86) PCT No.: PCT/JP2020/039256
§ 371 (c)(1),
(2) Date: Jun. 30, 2022

(87) PCT Pub. No.: WO2021/152931
PCT Pub. Date: Aug. 5, 2021

(65) Prior Publication Data
US 2023/0038200 A1      Feb. 9, 2023

(30) Foreign Application Priority Data

Jan. 30, 2020   (JP) ................. 2020-013566

(51) Int. Cl.
*H04W 16/28* (2009.01)
*H04B 7/155* (2006.01)
*H04W 92/12* (2009.01)

(52) U.S. Cl.
CPC ........ *H04B 7/15528* (2013.01); *H04W 16/28* (2013.01); *H04W 92/12* (2013.01)

(58) Field of Classification Search
CPC ........... H04B 7/15528; H04B 7/15535; H04W 4/023; H04W 4/40; H04W 16/28;
(Continued)

(56) References Cited

U.S. PATENT DOCUMENTS

2008/0227434 A1    9/2008   Nitta et al.
2014/0029507 A1*   1/2014   Dimou ................ H04W 72/541
                                                                    370/315
(Continued)

FOREIGN PATENT DOCUMENTS

JP    2003-324381 A    11/2003
JP    2007-228509 A     9/2007
(Continued)

OTHER PUBLICATIONS

3GPP, "Evolved Universal Terrestrial Radio Access (E-UTRA); Study on mobile relay (Release 12)", 3GPP TR 36.836 V12.0.0, Jun. 2014, pp. 1-36.

*Primary Examiner* — Harun Chowdhury
(74) *Attorney, Agent, or Firm* — XSENSUS LLP

(57) ABSTRACT

An apparatus according to an aspect of the present disclosure is a mobile relay station mounted on a vehicle, including: an antenna system capable of transmitting and receiving radio waves both inside and outside the vehicle; and a wireless control station capable of controlling directivity of the antenna system and having a function of switching between a first relay mode and a second relay mode described below, wherein the wireless control station switches the first and second relay modes on or off based on predetermined control information. First relay mode: mode for relaying communication between a wireless communication device outside the vehicle and a wireless communication device inside the vehicle. Second relay mode: mode for relaying communication between a wireless communi- (Continued)

cation device outside the vehicle and another wireless communication device outside the vehicle.

15 Claims, 8 Drawing Sheets

(58) Field of Classification Search
CPC ... H04W 84/047; H04W 84/06; H04W 88/04; H04W 92/12
USPC .............................. 370/252, 315, 329, 331
See application file for complete search history.

(56) References Cited

U.S. PATENT DOCUMENTS

| | | | |
|---|---|---|---|
| 2016/0165548 A1* | 6/2016 | Mohlmann | ........ H04B 7/15535 455/522 |
| 2017/0142625 A1 | 5/2017 | Oyabu | |
| 2018/0319495 A1* | 11/2018 | Tu | ........................ H04W 84/06 |

FOREIGN PATENT DOCUMENTS

| | | |
|---|---|---|
| JP | 2010-81435 A | 4/2010 |
| JP | 2017-92824 A | 5/2017 |
| WO | 2006/100714 A1 | 9/2006 |

* cited by examiner

MOBILE RELAY STATION, MOBILE COMMUNICATION SYSTEM, AND CONTROL METHOD OF MOBILE RELAY STATION

CROSS-REFERENCE TO RELATED APPLICATIONS

The present application is based on PCT/JP2020/039256 filed on Oct. 19, 2020, which claims priority to Japanese Application No. 2020-013566, filed on Jan. 30, 2020, the entire contents of each are incorporated herein by reference.

TECHNICAL FIELD

The present disclosure relates to a mobile relay station, a mobile communication system, and a control method of a mobile relay station.

BACKGROUND ART

In a mobile communication system, a technique related to a relay operation performed by a mobile relay station mounted on a moving body such as a vehicle is known (NPTL 1). This technology is used for a mobile relay station to relay communication between a user terminal and a base station in a train (PTL 1 and 2), and is suitable for a case where a vehicle is a train.

CITATION LIST

Patent Literature

PTL 1: Japanese Unexamined Patent Application Publication No. 2010-81435
PTL 2: Japanese Unexamined Patent Application Publication No. 2017-92824

Non Patent Literature

NPTL 1: 3GPP TR 36.836 v12.0.0

SUMMARY OF THE INVENTION

An apparatus according to an aspect of the present disclosure is a mobile relay station mounted in a vehicle. The mobile relay station includes an antenna system capable of transmitting and receiving a radio wave inside and outside the vehicle, and a wireless control station capable of controlling directivity of the antenna system, and having a function of switching between a first relay mode and a second relay mode, the first relay mode being a relay mode for communication between a wireless communication apparatus outside the vehicle and a wireless communication apparatus inside the vehicle, the second relay mode being a relay mode for communication between a wireless communication apparatus outside the vehicle and another wireless communication apparatus outside the vehicle. The wireless control station is configured to turn on or off the first relay mode and turn on or off the second relay mode on the basis of predetermined control information.

A system according to an aspect of the present disclosure is a mobile communication system. The mobile communication system includes a higher-level device, a base station configured to communicate with the higher-level device, and a mobile relay station mounted in a vehicle configured to wirelessly communicate with the base station. The mobile relay station includes an antenna system capable of transmitting and receiving a radio wave inside and outside the vehicle, and a wireless control station capable of controlling directivity of the antenna system, and having a function of switching between a first relay mode and a second relay mode, the first relay mode being a relay mode for communication between a wireless communication apparatus outside the vehicle and a wireless communication apparatus inside the vehicle, the second relay mode being a relay mode for communication between a wireless communication apparatus outside the vehicle and another wireless communication apparatus outside the vehicle, and the wireless control station is configured to turn on or off the first relay mode and turn on or off the second relay mode on the basis of predetermined control information.

A method according to an aspect of the present disclosure is a control method of a mobile relay station mounted in a vehicle. The mobile relay station includes an antenna system capable of transmitting and receiving a radio wave inside and outside the vehicle, and a wireless control station capable of controlling directivity of the antenna system, and having a function of switching between a first relay mode and a second relay mode. The control method includes obtaining predetermined control information, by the wireless control station, and turning on or off the first relay mode and turning on or off the second relay mode on the basis of the obtained control information, by the wireless control station.

The present invention can be implemented not only as a system and an apparatus including the above-described characteristic configuration but also as a program for causing a computer to execute the characteristic configuration. Further, the present invention can be implemented as a semiconductor integrated circuit that implements part or all of a system and an apparatus.

DETAILED DESCRIPTION

Figure 1:
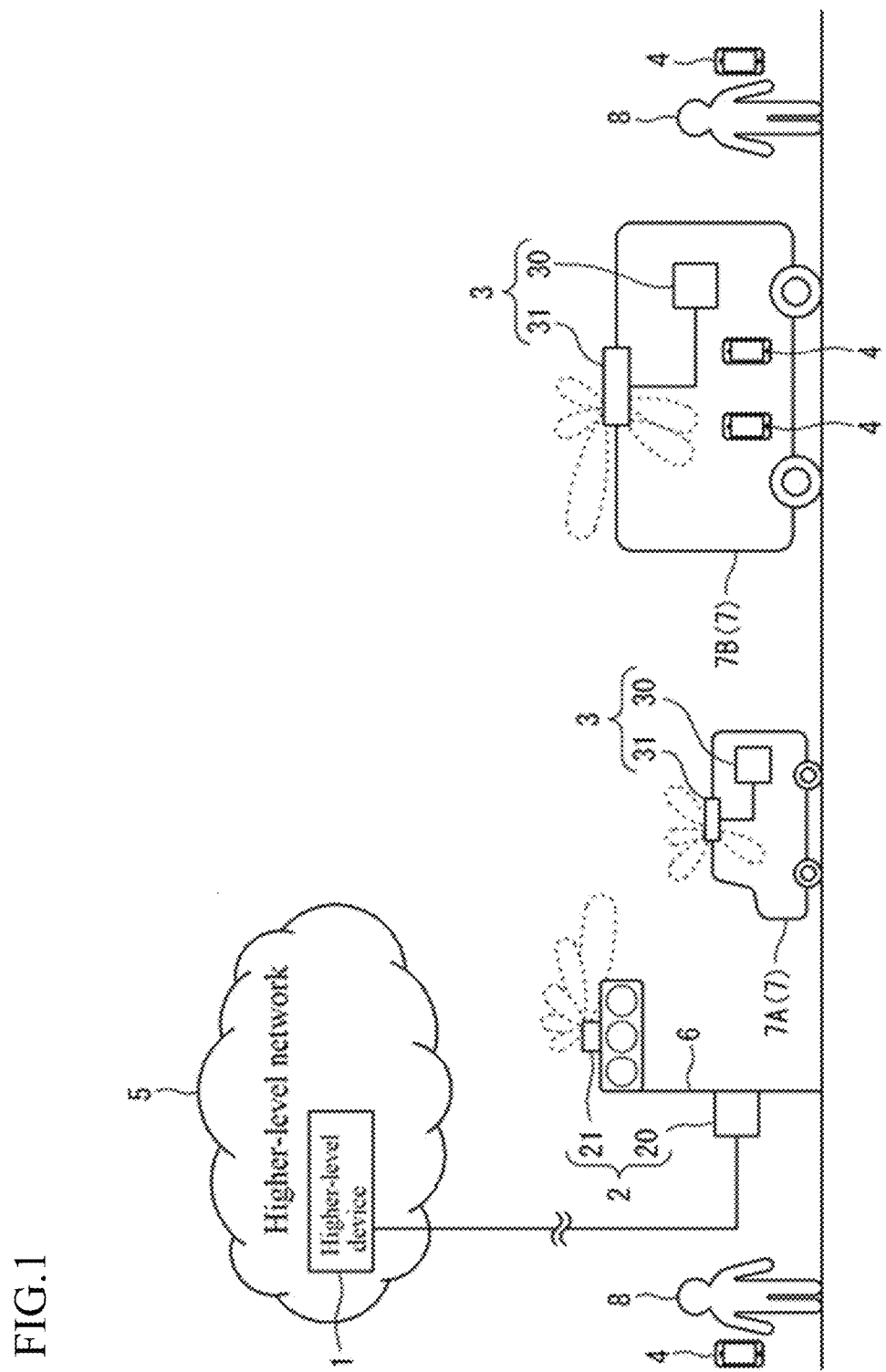
FIG. 1 is a schematic diagram showing an example of the overall configuration of a mobile communication system.

Problem to be Solved by the Present Disclosure

In the above-described related art, it is not assumed that the relay operation of the mobile relay station mounted on the vehicle is appropriately changed as necessary, for example, the relay function of the mobile relay station is switched to either the vehicle inward direction or the vehicle outward direction based on the traveling state of the vehicle or the like. In view of such conventional problems, an object of the present disclosure is to appropriately change a relay operation of a mobile relay station mounted on a vehicle.

Effects of the Present Disclosure

According to the present disclosure, it is possible to appropriately change a relay operation of a mobile relay station mounted on a vehicle.

Summary of Embodiment of the Present Invention

An outline of an embodiment of the present invention will be listed and described below.

(1) According to the present embodiment, a mobile relay station mounted in a vehicle includes an antenna system capable of transmitting and receiving a radio wave inside and outside the vehicle, and a wireless control station capable of controlling directivity of the antenna system, and having a function of switching between a first relay mode and a second relay mode, the first relay mode being a relay mode for communication between a wireless communication apparatus outside the vehicle and a wireless communication apparatus inside the vehicle, the second relay mode being a relay mode for communication between a wireless communication apparatus outside the vehicle and another wireless communication apparatus outside the vehicle. The wireless control station is configured to turn on or off the first relay mode and turn on or off the second relay mode on the basis of predetermined control information.

According to the mobile relay station of the present embodiment, since the wireless control station switches on or off the first and second relay modes based on the predetermined control information, it is possible to appropriately change the relay operation of the mobile relay station mounted on the vehicle.

(2) In the mobile relay station of the present embodiment, it is preferable that the control information includes a movement tendency of the vehicle, and the wireless control station is configured to turn on the first relay mode and turn off the second relay mode in a case where the movement tendency indicates traveling of the vehicle, and turn on the second relay mode in a case where the movement tendency indicates stopping of the vehicle.

In this way, when the vehicle is traveling, the mobile relay station functions as a relay station for a wireless communication apparatus (for example, a user terminal) inside the vehicle, and when the vehicle is stopped, the mobile relay station functions as a relay station for a wireless communication apparatus outside the vehicle (for example, a mobile relay station of another vehicle).

Therefore, it is possible to appropriately change the relay operation by the mobile relay station according to the traveling state of the vehicle.

(3) In the mobile relay station of the present embodiment, it is preferable that the control information includes an access mode of the wireless control station specified by a higher-level device in a mobile communication system, and the wireless control station is configured to turn on the first relay mode and turn off the second relay mode in a case where the access mode specified for the wireless control station is a CSG mode, and turn on the second relay mode in a case where the access mode specified for the wireless control station is a non-CSG mode.

In this way, the mobile relay station designated in the CSG mode functions as a relay station for a wireless communication apparatus (for example, a user terminal) inside the vehicle, and the mobile relay station designated in the non-CSG mode functions as a relay station for a wireless communication apparatus (for example, a mobile relay station of another vehicle) outside the vehicle. Therefore, it is possible to appropriately change the relay operation by the mobile relay station according to the type of the access mode designated by the higher-level device.

(4) In the mobile relay station according to the present embodiment, it is preferable that the higher-level device is configured to determine a type of the access mode of the wireless control station on the basis of a stay indicator that is an indicator indicating whether the wireless control station is staying within a predetermined range including a current location, specify the non-CSG mode as the access mode of the wireless control station in a case where the stay indicator of the wireless control station indicates staying, and specify the CSG mode as the access mode of the wireless control station in a case where the stay indicator of the wireless control station indicates non-staying.

It is preferable for the stationary vehicle to serve as a relay station for a wireless communication apparatus outside the vehicle (for example, a mobile relay station of another vehicle). It is preferable for the non-stationary vehicle to serve as a relay station for a wireless communication apparatus (for example, a user terminal) in the vehicle. These are the reasons.

(5) In the mobile relay station according to the present embodiment, it is preferable that the higher-level device is configured to specify the access mode to be applied to the wireless control station in response to reception of identification information indicating that the wireless control station is the mobile relay station.

In this way, it is possible to prevent an access mode from being erroneously designated to a communication node such as a base station other than a mobile relay station.

(6) In the mobile relay station according to the present embodiment, it is preferable that the control information includes a switch instruction generated in response to charging of the vehicle, and the wireless control station is configured to turn off the first relay mode and turn on the second relay mode in a case where the switch instruction is input. In this way, the vehicle being charged can function as a dedicated relay station for a wireless communication apparatus outside the vehicle (for example, a user terminal in building).

(7) In this case, it is preferable that the wireless control station is configured to control the antenna system so as to transmit a beam to a part of a building (for example, a windowpane) through which a radio wave easily reaches an inside of the building. In this way, the mobile relay station is easily connected to the user terminal in the building, and the vehicle on which the mobile relay station is mounted can be used as customer premises equipment.

(8) In the mobile relay station of the present embodiment, it is preferable that, the wireless control station is configured to adjust, in a case where the second relay mode is executed, a transmission power value of an outside-vehicle antenna element included in the antenna system on the basis of a measurement result of a reception radio wave communicated from a neighboring station outside the vehicle. In this way, it is possible to set a communication area in which an influence on an existing neighboring station outside the vehicle can be appropriately suppressed.

(9) In the mobile communication system of the present embodiment, it is preferable that the wireless control station is configured to further adjust a transmission parameter related to a beam transmission direction of the outside-vehicle antenna element included in the antenna system. In this way, the beam transmission direction can be appropriately adjusted for each neighboring station (user terminal or other mobile relay station) that is connected.

(10) A mobile communication system of the present embodiment is a mobile communication system including the mobile relay station according to (1) to (9) described above. Accordingly, the mobile communication system of the present embodiment exhibits the same operational advantages as those of the mobile relay station described in (1) to (9) above.

(11) A control method of the present embodiment is the control method of a mobile relay station according to (1) to (9) described above. Therefore, the control method of the present embodiment exhibits the same operational advantages as those of the mobile relay station described in (1) to (9) above.

Details of Embodiment of the Present Invention

Hereinafter, embodiments of the present invention will be described in detail with reference to the drawings. At least a part of the embodiments described below may be arbitrarily combined.

[Overall Configuration of Mobile Communication System]

FIG. 1 is a schematic diagram showing an example of the overall configuration of a mobile communication system. Referring to FIG. 1, the mobile communication system includes a higher-level device 1, at least one base station 2, a mobile relay station 3, and a user terminal 4. In the present embodiment, the generation of the mobile communication system is not particularly limited. It is assumed in the present disclosure to be the fourth generation or later (for example, the fifth generation).

Higher-level device 1 is configured by a server computer included in a higher-level network 5. Higher-level network 5 is configured by, for example, a core network, and higher-level device 1 is configured by, for example, a core server. The core server is configured by a mobility management entity (MME), a serving gateway (SSGW), or the like. Higher-level network 5 may be a metro network. Higher-level device 1 in this case is configured by an edge server.

Base station 2 is configured by a macro cell base station, a micro cell base station, or a pico cell base station. Base station 2 is installed in a predetermined structure such as a traffic signal 6 at an intersection. Base station 2 includes a wireless control station 20 and an antenna system 21. Antenna system 21 may comprise, for example, an active phased array antenna, a mechanically driven parabolic antenna, or a combination thereof. In the present embodiment, it is assumed that antenna system 21 is array antenna. Therefore, hereinafter, antenna system 21 of base station 2 is also referred to as "array antenna 21".

Wireless control station 20 can control the directivity of antenna system 21. Wireless control station 20 is connected to higher-level device 1 via, for example, an optical line. Note that the communication path between higher-level device 1 and base station 2 may partially or entirely include a communication path for wireless communication. In the example of FIG. 1, antenna system 21 is installed in traffic signal 6 signal light device, but may be installed in another structure. Hereinafter, wireless control station 20 of base station 2 fixedly installed in a structure or the like is also referred to as "fixed control station 20".

Mobile relay station 3 is configured by a wireless communication device mounted on a vehicle 7. Vehicle 7 includes vehicles of various sizes such as a small vehicle 7A and a large vehicle (for example, a route bus) 7B. Vehicle 7 may be driven by any of an engine, an electric motor, and a hybrid system. The driving mode of vehicle 7 may be either a normal driving mode in which the rider performs acceleration/deceleration, steering, and the like, or an automatic driving mode in which software executes these operations.

Mobile relay station 3 includes a wireless control station 30 and an antenna system 31. Antenna system 31 may comprise, for example, an active phased array antenna, a mechanically driven parabolic antenna, or a combination thereof. In the present embodiment, it is assumed that antenna system 31 is array antenna. Therefore, hereinafter, antenna system 31 of mobile relay station 3 is also referred to as "array antenna 31".

Wireless control station 30 can control the directivity of antenna system 31. Antenna system 31 includes one or a plurality of antenna elements provided inside the vehicle and a plurality of antenna elements provided outside the vehicle, and can transmit and receive radio waves both inside and outside the vehicle. In the example of FIG. 1, antenna system 31 is installed in the ceiling portion of vehicle 7, but may be installed in another portion. Hereinafter, wireless control station 30 of mobile relay station 3 mounted on vehicle 7 or the like is also referred to as "mobile control station 30".

User terminal 4 is configured by a communication terminal carried by a user 8. The communication terminal is configured by a communication interface corresponding to mobile communication, such as a smartphone, a mobile phone, a tablet personal computer, or a notebook personal computer. User 8 carrying user terminal 4 includes, for example, a person who moves on foot outdoors such as a road or a parking lot and indoors such as a building or an underground mall. User 8 carrying user terminal 4 may be an occupant of vehicle 7.

[Internal Configuration of Higher-Level Device]

Figure 2:
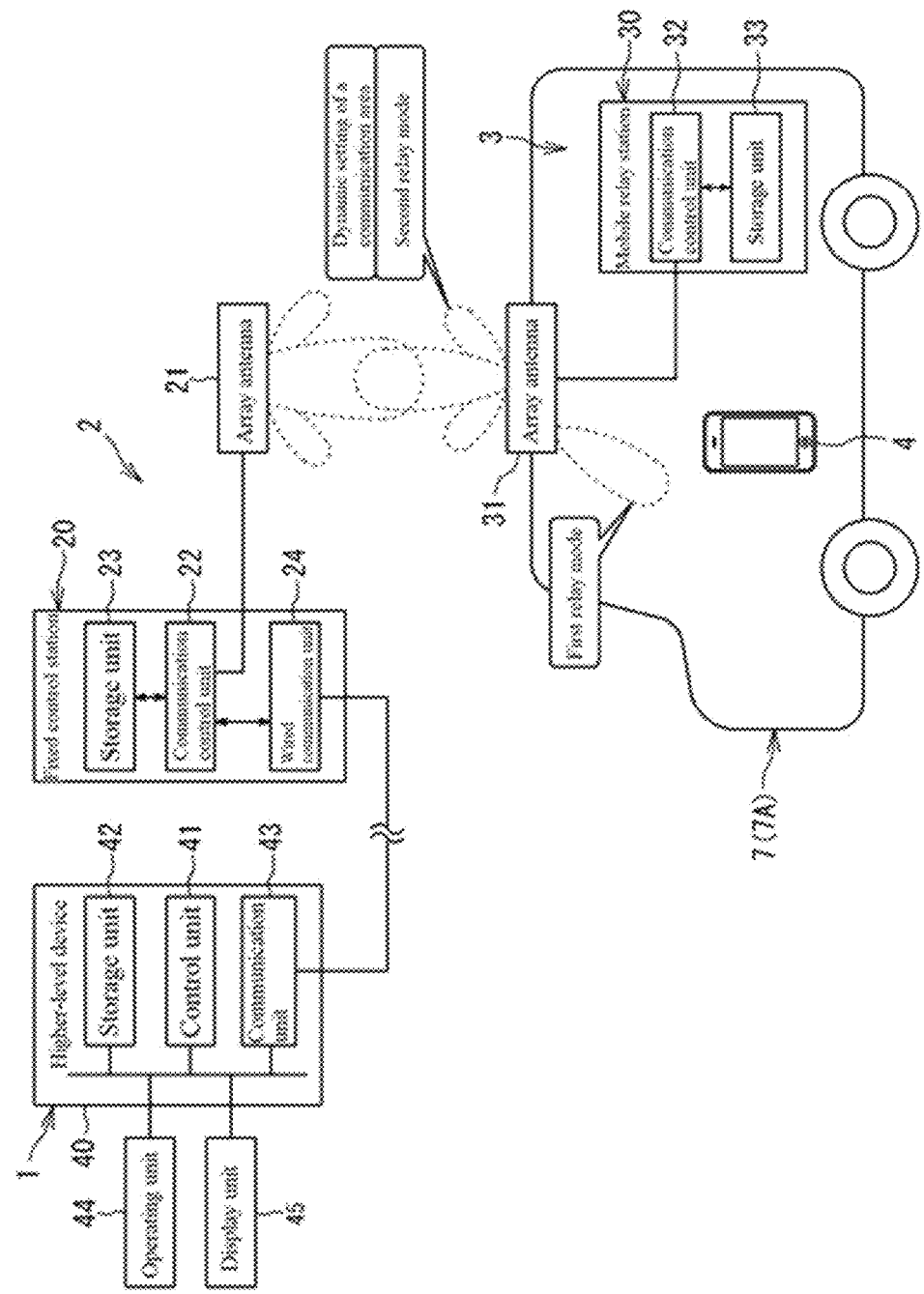
FIG. 2 is a block diagram showing an example of internal configurations of a higher-level device, a base station, and a mobile relay station.

FIG. 2 is a block diagram showing an example of internal configurations of higher-level device 1, base station 2, and mobile relay station 3. As shown in FIG. 2, higher-level device 1 of the present embodiment includes a control unit 41, a storage unit 42, and a communication unit 43 which are accommodated in a housing 40. An operating unit 44 and a display unit 45 are connected to housing 40 of higher-level device 1.

Control unit 41, storage unit 42, and communication unit 43 are mounted on a backplane in housing 40. Operating unit 44 and display unit 45 are connected to predetermined connectors of the backplane, respectively. Control unit 41 includes an arithmetic processing unit including a central processing unit (CPU) and a main memory including a random access memory (RAM). The CPU of control unit 41 reads a computer program installed in storage unit 42 into the main memory, and performs various types of information processing according to the program.

Storage unit 42 is configured by a recording medium and an auxiliary storage device. The recording medium includes at least one non-volatile memory of a hard disk drive (HDD) and a solid state drive (SSD). The auxiliary storage device includes at least one of an external or built-in optical drive. Communication unit 43 is configured by a communication card that performs wired communication with an external device in accordance with a predetermined communication protocol. Communication unit 43 is connected to base station 2 via an optical line or the like.

Operating unit 44 is configured by an input device such as a keyboard and a pointing device. The operator of the communication carrier can transmit a predetermined command to control unit 41 of higher-level device 1 by an operation input such as a command input or a click on operating unit 44. Display unit 45 is configured by a display device such as a liquid crystal monitor or an organic EL panel. Display unit 45 can display a graphical user interface (GUI) screen or the like for receiving an operation input to operating unit 44.

[Internal Configuration of Base Station]

As shown in FIG. 2, wireless control station (fixed control station) 20 of base station 2 includes a communication control unit 22, a storage unit 23, and a wired communication unit 24. Communication control unit 22 is connected to array antenna 21 via a predetermined communication line. Wired communication unit 24 is configured by a communication card that performs wired communication with an external device in accordance with a predetermined communication protocol. Wired communication unit 24 is connected to higher-level device 1 via an optical line or the like.

Communication control unit 22 is configured by, for example, an arithmetic processing unit including a main memory including a CPU and a RAM. The CPU of communication control unit 22 reads a computer program installed in storage unit 23 into the main memory, and performs various types of information processing according to the program. Communication control unit 22 may be configured by one or a plurality of integrated circuits such as a field programmable gate array (FPGA) and an application specific integrated circuit (ASIC) other than or in addition to the CPU.

Communication control unit 22 of fixed control station 20 performs various communication controls according to a predetermined mobile communication standard, such as directivity control of array antenna 21 and adjustment processing of transmission parameters.

[Internal Configuration of Mobile Relay Station]

Referring to FIG. 2, wireless control station (mobile control station) 30 of mobile relay station 3 includes a communication control unit 32 and a storage unit 33. Communication control unit 32 is connected to array antenna 31 via a predetermined communication line. Communication control unit 32 is configured by, for example, an arithmetic processing unit including a CPU and a main memory configured by a RAM.

The CPU of communication control unit 32 reads a computer program installed in storage unit 33 into the main memory, and performs various types of information processing according to the program. Communication control unit 32 may be configured by one or a plurality of integrated circuits such as an FPGA and an ASIC other than or in addition to the CPU.

Communication control unit 32 of mobile control station 30 performs various communication controls in accordance with a predetermined mobile communication standard, such as directivity control of array antenna 31 and adjustment processing of transmission parameters. Communication control unit 32 of mobile control station 30 performs not only communication control in accordance with the communication standard but also control such as communication area setting processing (step S5 in FIG. 3) for setting a communication area in array antenna 31 using the area setting information notified from higher-level device 1.

[Relay Mode and Communication Area of Mobile Relay Station]

In the present embodiment, the relay mode that can be executed by communication control unit 32 of mobile control station 30 includes the following two types of modes.

First relay mode: a mode for relaying for communication between a wireless communication apparatus outside the vehicle (base station 2 or another mobile relay station 3) and a wireless communication apparatus inside the vehicle (user terminal 4)

Second relay mode: a mode for relaying for communication between a wireless communication apparatus outside the vehicle (base station 2 or another mobile relay station 3) and another wireless communication apparatus outside the vehicle (another mobile relay station 3 or user terminal 4)

Communication control unit 32 can switch the relay mode to either ON or OFF in response to acquisition of predetermined control information. Therefore, the relay operation by mobile control station 30 includes the following four types.

First state: First relay mode On, Second relay mode On
Second state: First relay mode On, Second relay mode Off
Third state: First relay mode Off, Second relay mode On
Fourth state: First relay mode Off, Second relay mode Off "Off" of the first relay mode means that the transmission operation to the inside-vehicle antenna element is substantially stopped, for example. "Off" of the second relay mode means that the transmission operation to the outside-vehicle antenna element is substantially stopped, for example. The transmission operation of the antenna element can be substantially stopped by, for example, stopping the power supply to the antenna element. However, not only the case where power supply to all the antenna elements is completely stopped but also the case where power supply to some of the plurality of antenna elements is stopped and the case where the amount of power to each antenna element is reduced to a predetermined value or less are included in the concept of the substantial stop.

For example, when mobile control station 30 acquires control information indicating that the own vehicle is traveling on a road, the mobile control center sets the first relay mode to an on state and sets the second relay mode to an off state (Second state). Therefore, while vehicle 7 is traveling, a communication area is established only inside vehicle 7.

For example, when mobile control station 30 acquires control information indicating that the own vehicle is highly likely to stop for a predetermined time or more, the mobile control center switches on the second relay mode in addition to the first relay mode (First state).

When the second relay mode is turned on, mobile control station 30 determines the transmission direction of the radio wave to the outside of the vehicle based on the road extension direction included in the downlink information of the optical beacon, the position information of traffic signal 6, the vehicle height of the peripheral vehicle specified by the in-vehicle camera, and the like. When mobile relay station 3 executes the second relay mode, coverage (FR2 coverage in 5G) can be extended to a non-line-of-sight area that temporarily occurs at an intersection. The non-line-of-sight area is an area where the radio wave of base station 2 is difficult to go around due to, for example, a large vehicle 7B or the like, for example.

However, if mobile control station 30 newly sets a communication area outside the vehicle without considering interference with base station 2 or another mobile relay station 3, communication quality at the cell boundary deteriorates. Therefore, mobile control station 30 sets the communication area outside the vehicle when the second relay mode is executed while performing interference arbitration with the neighboring station (dynamic setting of the communication area). In detail, mobile control station 30 adjusts the transmission parameter for the outside of the vehicle based on the interference prediction value information by the donor station, the measurement result of the reception power by the neighboring station, and the like.

The above-described communication area setting process may be executed not only when vehicle 7 stops near an intersection but also when vehicle 7 stops at a predetermined place such as a parking lot or a roadside.

[Operation Sequence of Dynamic Setting of Communication Area]

Figure 3:
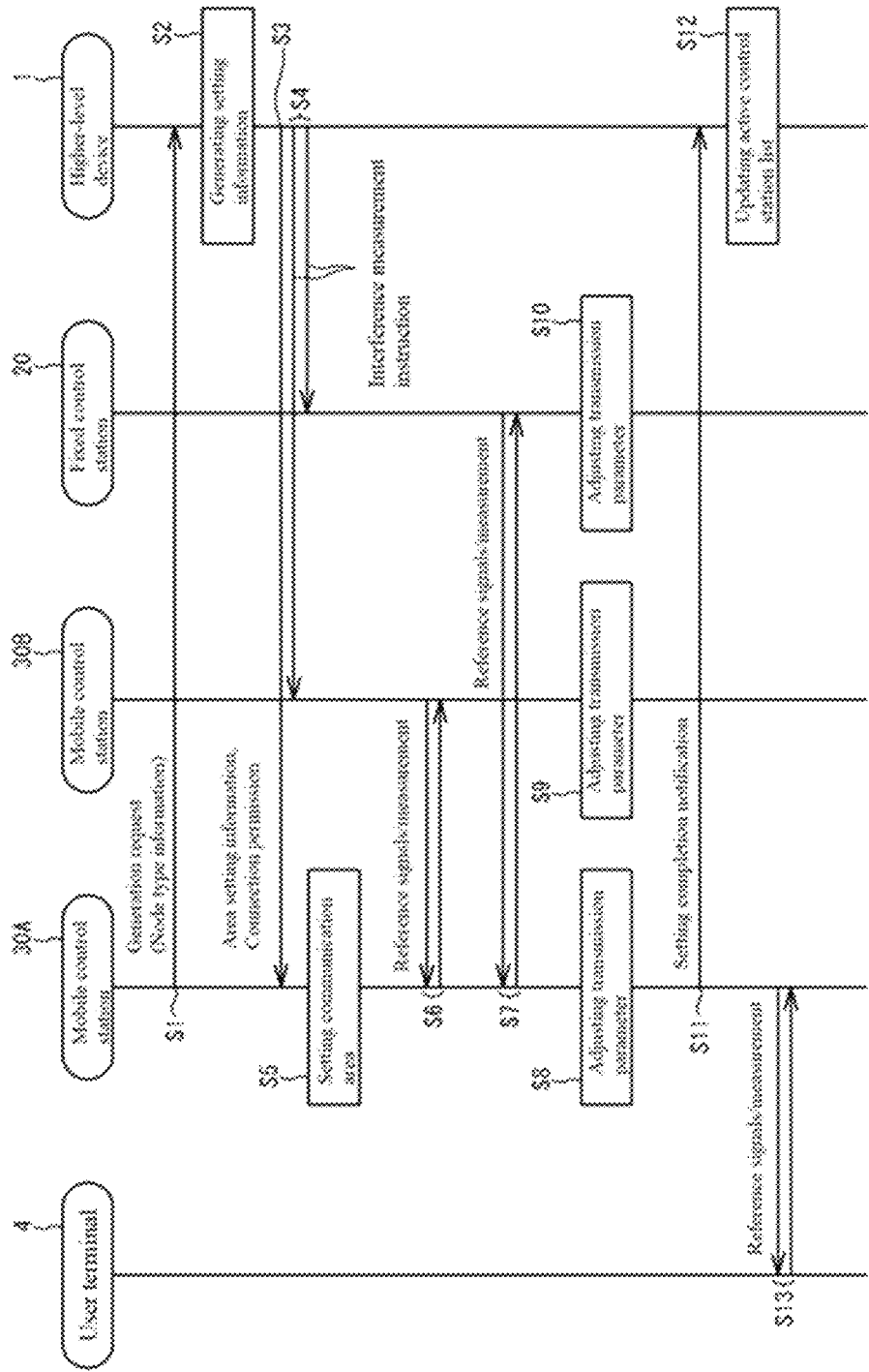
FIG. 3 is a sequence diagram showing an operation procedure of dynamic setting of a communication area.

FIG. 3 is a sequence diagram showing an operation procedure of dynamic setting of a communication area. In FIG. 3, mobile control station 30A is mobile control station 30 that newly sets a communication area outside the vehicle in order to start the second relay mode. A mobile control station 30B is mobile control station 30 in which the dynamic setting of the communication area has been completed. In addition, it is assumed that fixed control station 20 and mobile control station 30B are neighboring stations outside the vehicle located in the vicinity of mobile control station 30A.

When switching on the second relay mode of the own vehicle, mobile control station 30A transmits a generation request for area setting information to higher-level device 1 (step S1). Mobile control station 30A includes identification information indicating that its own station is mobile relay station 3 in the generation request. Therefore, higher-level device 1 that has received the generation request senses that the node type of the transmission source is "mobile control station 30".

Higher-level device 1 that has received the generation request from mobile control station 30A executes the generating process of the setting information (step S2). The generating process of the setting information is generating information which is necessary for setting a communication area without radio wave interference (hereinafter referred to as "area setting information"). The area setting information includes a measurement instruction of channel quality, a node ID and position information of a wireless control station to be arbitrated, a beam transmission angle, and the like. The details of the generating process of the setting information (see FIG. 4) will be described later.

Next, higher-level device 1 transmits the generated area setting information to mobile control station 30A (step S3). The area setting information transmitted to mobile control station 30A includes a connection permission message. In addition, higher-level device 1 transmits an interference measurement instruction to mobile control station 30B, which is a neighboring station, and fixed control station 20 (step S4).

Mobile control station 30A that has received the area setting information executes communication area setting processing using the acquired area setting information (step S5). The communication area setting process is a process in which mobile control station 30A sets a communication area to be applied to array antenna 31 of its own station. Details of the communication area setting process will be described later.

Next, mobile control station 30A performs measurement of the reception strength based on the reference signal with the neighboring station (steps S6 and S7). To be more specific, mobile control station 30A and mobile control station 30B exchange reference signals with each other to measure the reception strength therebetween (step S6), and mobile control station 30A and fixed control station 20 also exchange reference signals with each other to measure the reception strength therebetween (step S7).

Next, each of mobile control station 30A, mobile control station 30B, and fixed control station 20 performs a transmission parameter adjustment process (steps S8 to S10). The transmission parameter adjustment processing is processing for adjusting a transmission parameter related to the transmission direction of a beam by array antenna 31. Details of the transmission parameter adjustment processing will be described later.

Upon completion of the transmission parameter adjustment processing, mobile control station 30A transmits a setting completion notification to higher-level device 1 (step S11).

Upon receiving the setting completion notification, higher-level device 1 updates the active control station list managed by higher-level device 1 (step S12). To be more specific, higher-level device 1 registers the node IDs of mobile control station 30A in the operating control station list on condition that the access mode of mobile control station 30A, which is the transmission source of the configuration completion notification, is the non-CSG mode described later.

Upon completion of the transmission parameter adjustment processing, mobile control station 30A measures the reception strength based on the reference signal with user terminal 4 (step S13), and starts wireless communication with user terminal 4.

[Generating Process of Setting Information (Step S2 in FIG. 3)]

Figure 4:
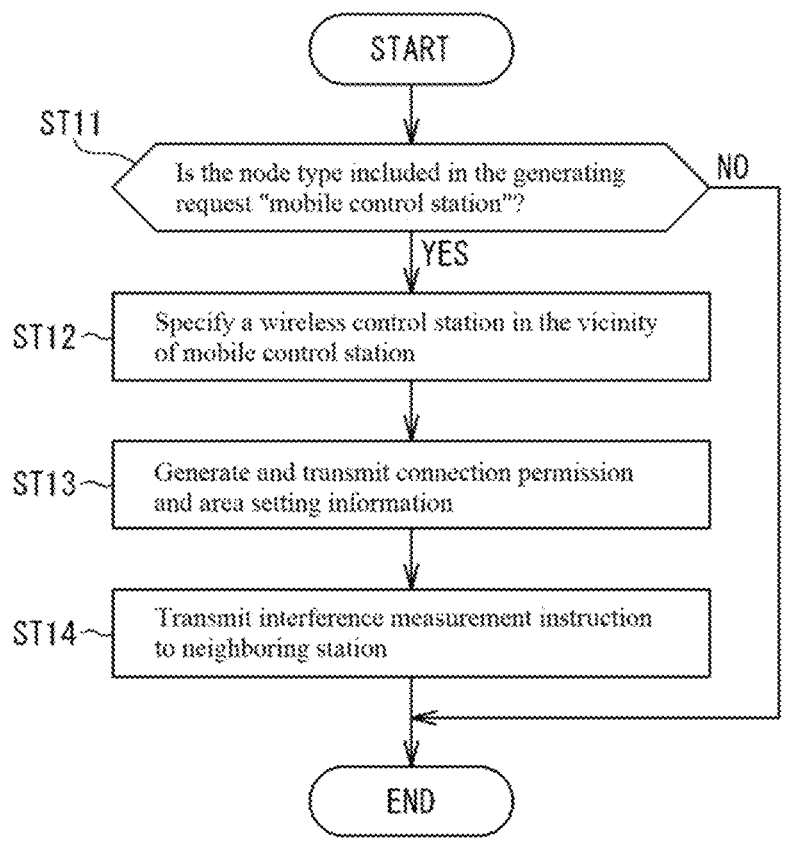
FIG. 4 is a flowchart showing an example of generating process of setting information.

FIG. 4 is a flowchart showing an example of generating process of setting information. As shown in FIG. 4, when control unit 41 of higher-level device 1 receives the generation request message, it determines that the node type included in the message is "mobile control station" or not (step ST11).

When the determination result is negative, control unit 41 ends the process. When the determination result is positive, control unit 41 specifies a wireless control station (neighboring station) outside the vehicle in the vicinity of mobile control station 30A (step ST12). This specific processing is, for example, a process of extracting a wireless control station outside the vehicle included in a circle of a predetermined radius (for example, 100 m) centered on the current location of mobile control station 30A.

Next, control unit 41 generates connection permission and area setting information of mobile control station 30A, and transmits a message including the generated information to mobile control station 30A (step ST13). In addition, control unit 41 transmits a message including an interference measurement instruction to mobile control station 30A which is a neighboring station and fixed control station 20 (step ST14), and then ends the processing.

The area setting information includes the types of access modes applied to mobile control station 30A, in addition to frequencies and bandwidth that allow mobile control station 30A to avoid interference with neighboring stations. The types of access modes include, for example, a CSG mode and a non-CSG mode. The closed subscriber group (CSG) mode is an access mode in which an access right is given only to a user of vehicle 7, and the non-CSG mode is an access mode in which a user to whom an access right is given is not limited.

Control unit 41 of higher-level device 1 determines the type of the access mode to be applied to mobile control station 30A based on the stay indicator of mobile control station 30A. The stay indicator indicates, for example, whether or not mobile control station 30A is staying within a predetermined range including the current location (for example, within a circle of radius 10 m centered at current location). The estimated stay time used to determine the stay indicator is defined in advance for each piece of infrastructure information (congested section or parking lot) in a predetermined area including the current location of mobile relay station 30A, for example.

When the estimated stay time of mobile control station 30A is equal to or longer than a predetermined time (for example, 5 minutes), control unit 41 determines that the stay indicator of mobile control station 30A is "staying". In this case, control unit 41 designates the non-CSG mode as the access mode of mobile control station 30A determined to be staying.

When the estimated stay time of mobile control station 30A is less than a predetermined time (for example, 5 minutes), control unit 41 determines that the stay indicator of mobile control station 30A is "non-staying". In this case, control unit 41 designates the CSG mode as the access mode of mobile control station 30A determined to be non-staying.

[Communication Area Setting Process (Step S5 in FIG. 3)]

The setting processing of the communication area by mobile control station 30A includes switching processing of the relay mode and interference adjustment processing of the radio wave outside the vehicle. The relay mode switching process is a process of switching on/off the first and second relay modes by determining which antenna element is to be operated based on the type of the access mode notified from higher-level device 1.

For example, when the type of the notified access mode is the "CSG mode", mobile control station 30A operates only the antenna element for the vehicle interior of array antenna 31. That is, mobile control station 30A turns on the first relay mode and turns off the second relay mode (second state).

When the type of the notified access mode is the "non-CSG mode", mobile control station 30A does not set the operation restriction of array antenna 31. That is, mobile control station 30A turns on the first relay mode and turns on the second relay mode (first state). In this case, the first relay mode may be turned off and the second relay mode may be turned on (third state).

The radio wave outside the vehicle interference adjustment process is a process of adjusting the transmission power value of the outside-vehicle antenna element included in array antenna 31 when the second relay mode is executed. To be more specific, mobile control station 30A receives the interfered information in the neighboring station or the increase/decrease instruction of the transmission power by feedback from the donor station. Then, mobile control station 30A adjusts the transmission power value of array antenna 31 with respect to the initial value by a predetermined step size based on the received information.

In a case where the access mode notified from higher-level device 1 is the CSG mode, the second relay mode is turned off, and thus mobile control station 30A does not perform the above-described interference. The interference adjustment processing of the radio wave outside the vehicle may be executed again in response to a position change of vehicle 7 on which mobile control station 30A is mounted. In this case, higher-level device 1 may instruct execution in response to notification of the channel measurement result from mobile control station 30A. Alternatively, mobile control station 30A may autonomously execute the interference adjustment process in response to a change in position of vehicle 7.

[Adjustment Process of Transmission Parameter (Steps S8 to S10 in FIG. 3)] The adjustment process of the transmission parameter by wireless control station 30A, 30B, 20 is, for example, processing of adjusting the transmission parameter related to the beam transmission direction of the outside-vehicle antenna element included in array antenna 31, which is performed after the adjustment of the transmission power based on the feedback information from the neighboring station.

To be specific, wireless control station 30A, 30B, and 20 adjust the azimuth in which user terminal 4 to be connected to the own station exists based on the angle calculated from the position information of the connection terminal, the position information of the own station, the front azimuth information, and the like, and control the beam transmission direction of the outside-vehicle antenna element so as to transmit the beam in the adjusted azimuth.

When the neighboring station receives the reference signal of its own station with a certain quality or more and determines that the given interference is excessive, wireless control station 30A, 30B, 20 calculate the given interference azimuth from the relative positional relationship between its own station and the neighboring station and controls the beam transmission direction of the outside-vehicle antenna element so as not to direct the beam to the calculated given interference azimuth.

In the case of the transmission parameter adjustment processing by mobile control station 30A (step S8 in FIG. 3), relay mode switching processing may be executed in addition to the adjustment processing described above. For example, mobile control station 30A may execute the relay mode switching process based on the movement tendency of vehicle 7. The movement tendency is, for example, a movement average value of the traveling speed data of vehicle 7 in the latest predetermined time (for example, 1 minute) in the past.

For example, when the movement tendency is a predetermined threshold value (for example, 3 km/h) or more (the vehicle is estimated to be traveling), mobile control station 30A operates only the antenna elements for the vehicle interior of array antenna 31. That is, mobile control station 30A turns on the first relay mode and turns off the second relay mode (second state).

In addition, when the movement tendency is less than a predetermined threshold value (for example, 3 km/h, the vehicle is estimated to be stopped), mobile control station 30A operates the inside-vehicle antenna element and the outside-vehicle antenna element of array antenna 31. That is, mobile control station 30A turns on the first relay mode and turns on the second relay mode (first state). In this case, the first relay mode may be turned off and the second relay mode may be turned on (third state).

When the stay tendency is notified from higher-level device 1, mobile control station 30A may perform the relay mode switching process based on the stay tendency. To be specific, mobile control station 30A controls array antenna 31 so as to transmit the beam only to the inside of the vehicle when the stay tendency is the non-staying, and controls array antenna 31 so as to transmit the beam also to the outside of the vehicle when the stay tendency is the staying.

[Positional Relationship Requiring Communication by Relay Path]

Figure 5:
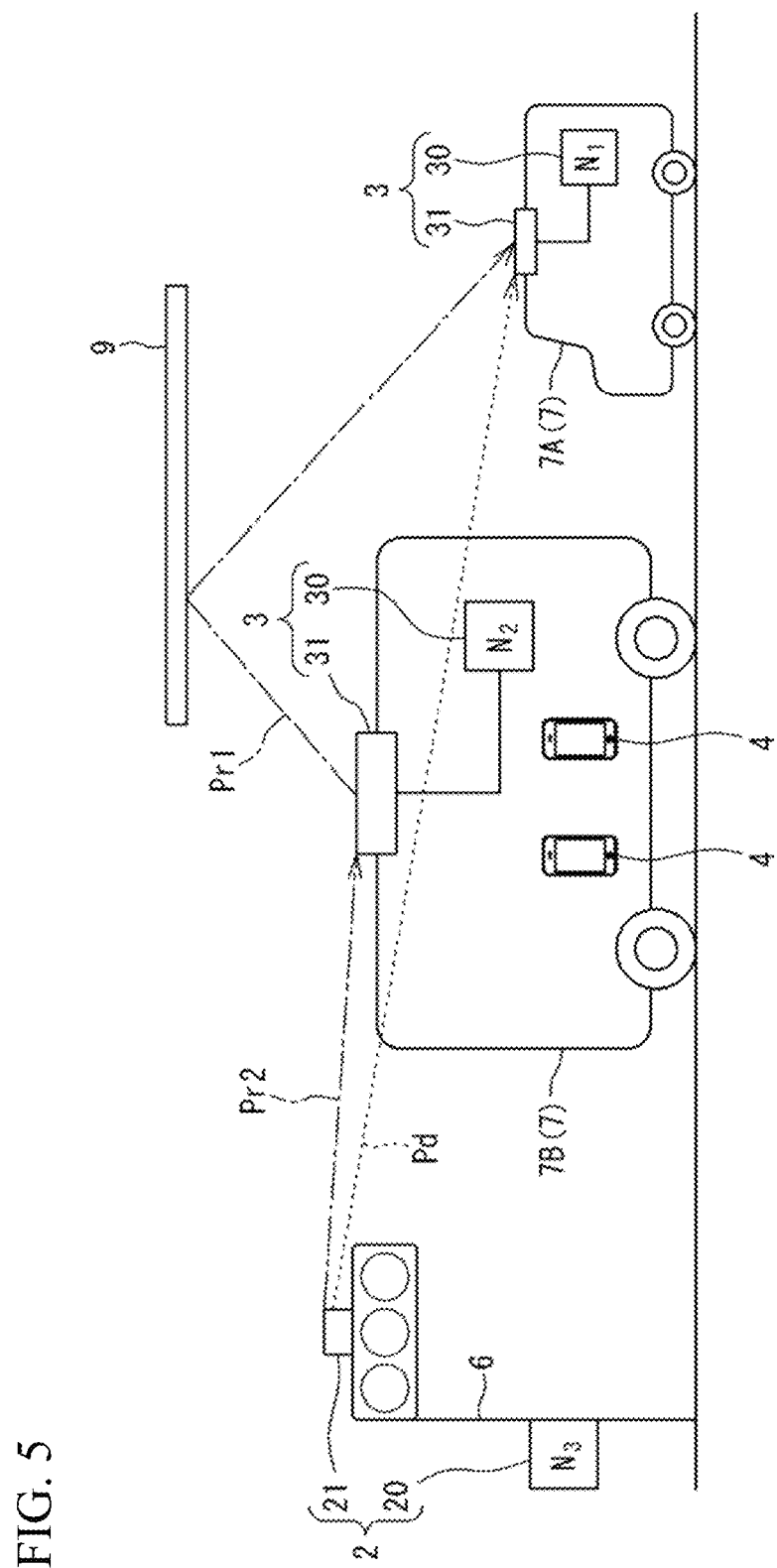
FIG. 5 is an explanatory diagram showing an example of the positional relationship of a plurality of communication nodes that require communication via a relay path.

FIG. 5 is an explanatory diagram showing an example of a positional relationship of a plurality of communication nodes N1 to N3 that require communication via relay paths Pr1 and Pr2. As shown in FIG. 5, it is assumed here that a communication node N1 is mobile control station 30 of small vehicle 7A, a communication node N2 is mobile control station 30 of large vehicle 7B, and a communication node N3 is fixed control station 20.

Small vehicle 7A is close to the tail of large vehicle 7B, and the distance between the antennas of communication node N1 and communication node N3 is larger than the distance between the antennas of communication node N2 and communication node N3. Therefore, the direct path Pd connecting the antennas of communication node N1 and communication node N3 by a straight line is blocked by large vehicle 7B, and communication node N1 and communication node N3 are in a positional relationship in which communication cannot be performed by the direct path Pd.

A reflector 9 is installed above the inflow passage of the intersection. Reflector 9 is held in a horizontal state at a predetermined height position by a support and a beam member (not shown).

Therefore, communication node N2 and communication node N1 have a positional relationship in which communication can be performed in the path Pr1 reflected by reflector 9. Further, communication node N2 and communication node N3 have a positional relationship in which direct communication can be performed in the path Pr2.

As shown in FIG. 5, even if communication node N3 cannot communicate with communication node N1 via the direct path Pd, communication node N1 can communicate with communication node N3 via the relay paths Pr1 and Pr2 if communication node N1 and communication node N2 can communicate via the reflection path Pr1. Therefore, it is necessary to perform a process in which mobile control station 30 can be autonomously connected to each other. A concrete example of the connection process between mobile control stations 30 will be described below.

[Example of Connection Processing Between Mobile Control Stations]

Figure 6:
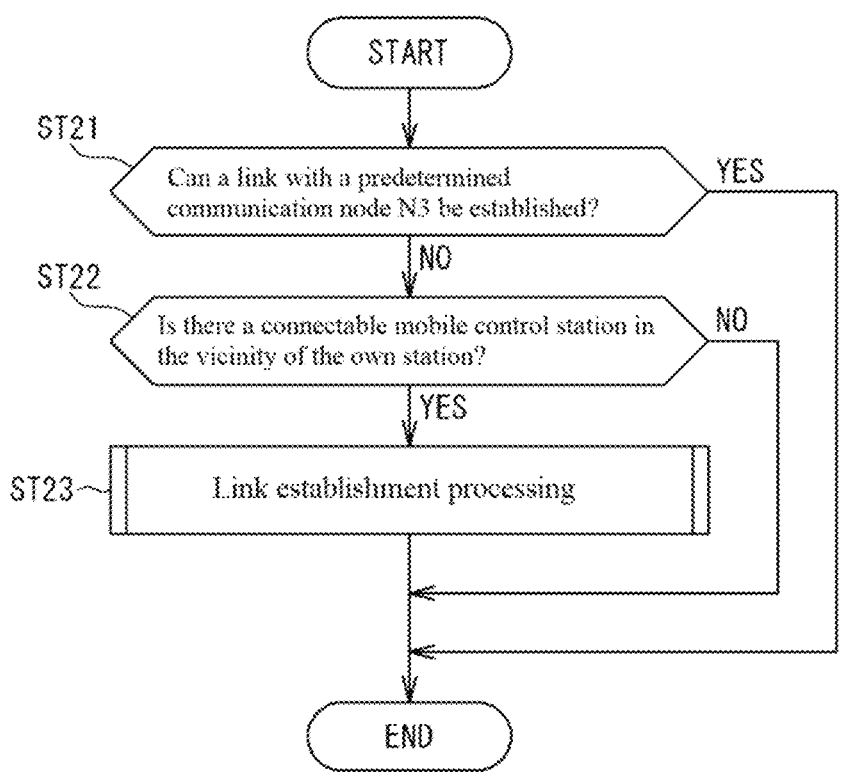
FIG. 6 is a flowchart showing an example of a connection process between mobile control stations.

FIG. 6 is a flowchart showing an example of a connection process between mobile control stations 30. The connection process of FIG. 6 is executed by the terminal communication node N1 (mobile control station 30 of small vehicle 7A) on the most downlink side.

As shown in FIG. 6, first, communication node N1 determines a link with a predetermined communication node N3 (fixed control station 20) can be established (step ST21). In the example of FIG. 5, communication node N3 is fixed control station 20, but in the connection process of FIG. 6, communication node N3 may be either fixed control station 20 or mobile control station 30.

The determination processing of step ST21 is performed, for example, based on whether or not the measurement result of the channel quality based on the measurement instruction from communication node N3 at a predetermined range or more from the own station is a predetermined threshold value or more.

Specifically, communication node N1 determines that the link can be established when the measurement result of the channel quality is a threshold value or more, and determines that the link cannot be established when the measurement result is less than the threshold value.

When the determination result of step ST21 is positive, communication node N1 ends the process. When the determination result of step ST21 is negative, communication node N1 further determines there is a connectable mobile control station 30 in the vicinity of the own station except for communication node N3 or not (step ST22).

The determination process of the step ST22 can be performed, for example, based on the position information of mobile control station 30 for which the link has been established, which is notified from higher-level device 1. The step ST22 determination process can also be performed based on the image data captured by small vehicle 7A. In this case, communication node N1 may determine that communication node N2 of large vehicle 7B can be connected when large vehicle 7B included in the image data has a predetermined vehicle height or more and is present in the vicinity of the azimuth connecting communication node N1 and communication node N3.

When the determination result of step ST22 is negative, communication node N1 ends the process. When the determination result of step ST22 is positive, communication node N1 executes link establishment processing with the detected communication node N2 (step ST23).

The link establishment processing in step ST23 is executed in response to communication node N1 transmits a connection request to communication node N2. The link establishment processing in step ST23 can also be executed by communication node N1 transmitting a connection request to higher-level device 1 and higher-level device 1 instructing communication node N2 to start the link establishment process. The link establishment processing in response to the above procedure can be performed based on, for example, "wireless backhaul establishment processing" described in 3GPP NR Rel-16 IAB (3GPP TR 38.874 v16.0.0).

[Another Example of Connection Process Between Mobile Control Stations]

Figure 7:
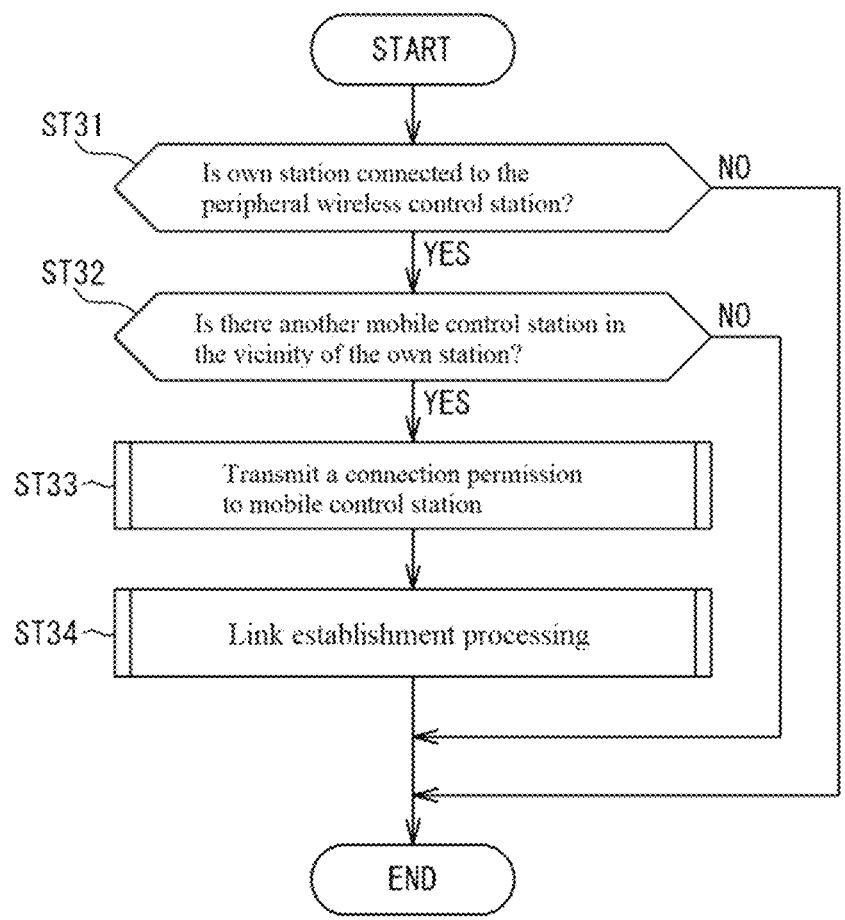
FIG. 7 is a flowchart showing another example of a connection process between mobile control stations.

FIG. 7 is a flowchart showing another example of connection process between mobile control stations 30. The connection processing of FIG. 7 is executed by communication node N2 (mobile control station 30 of large vehicle 7B) in charge of relaying in the middle of the relay paths Pr1 and Pr2.

As shown in FIG. 7, first, communication node N2 determines its own station is connected to the peripheral wireless control station 20, 30 or not (step ST31). When the determination result is negative, communication node N2 ends the process. When the above determination result is positive, communication node N2 determines there is another mobile control station 30 in the vicinity of the own station or not (step ST32).

The determination process of the step ST32 can be performed, for example, based on the image data captured by large vehicle 7B. In this case, if small vehicle 7A is included in the image data, communication node N2 may determine that there is another mobile control station 30 around the own station.

The determination process of the step ST32 may be performed based on a quality indicator such as signal reception quality in the own station when the approach of mobile control station 30 to the own station is detected. In this case, communication node N2 may determine that there is another mobile control station 30 when the quality indicator is equal to or greater than a predetermined threshold value, and may determine that there is no other mobile control station 30 when the quality indicator is less than the predetermined threshold value. The determination condition may include that the vehicle height of large vehicle 7B on which the own station is mounted is equal to or greater than a predetermined value.

When the determination result of step ST32 is negative, communication node N2 ends the process. When the determination result of step ST32 is positive, communication node N2 transmits a connection permission to mobile control station 30 whose presence has been detected (step ST33).

The connection permission in step ST33 is executed by a method in which it is known to mobile control station 30 existing in the periphery of the own station that the own station is a connectable wireless control station.

For example, communication node N2 may start periodic transmission of a reference signal for communication quality measurement, or may transmit, to higher-level device 1, a message notifying that it is mobile control station 30 to which the own station can connect.

Next, communication node N2 executes a link establishment process with mobile control station 30 (communication node N1) responding to the connection permission (step ST34). Since the link establishment process is the same as that in step ST23 described above, description thereof will be omitted. In the connection process of FIG. 7, the determination process of step ST32 may be omitted. That is, communication node N2 may transmit the connection permission without checking whether or not another mobile control station 30 is present in the surrounding area.

[Example of Use as Customer Premises Equipment]

Figure 8:
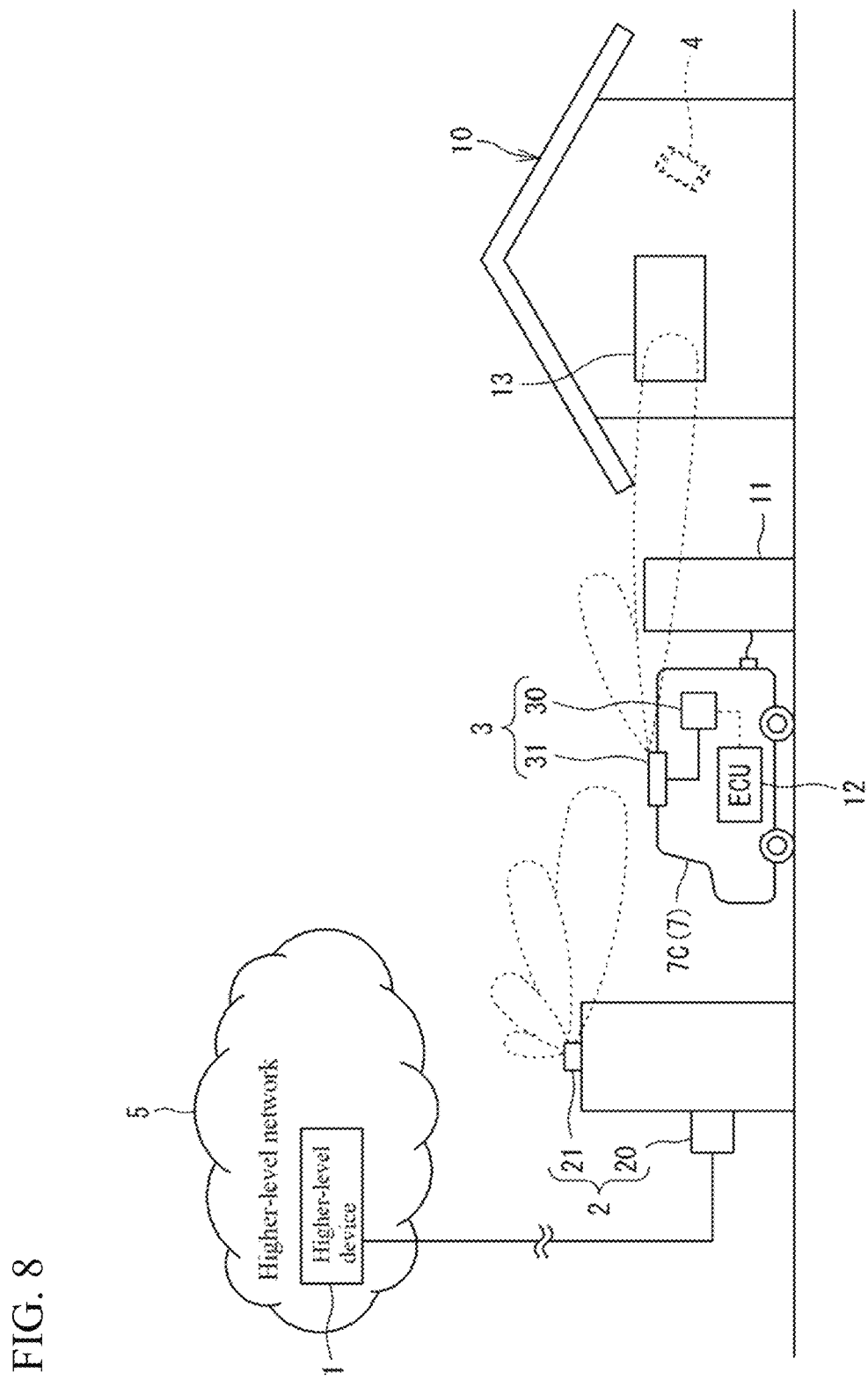
FIG. 8 is an explanatory diagram showing an example of use of a vehicle mounted on a mobile relay station.

FIG. 8 is an explanatory diagram showing an example of use of a vehicle 7 mounted on mobile relay station 3.

In the example of use shown in FIG. 8, vehicle 7 is configured by an electric vehicle 7C mounted on mobile relay station 3, and electric vehicle 7C is used as a customer premises equipment (hereinafter referred to as "CPE"). Electric vehicle 7C is not limited to an automobile having only an electric motor as a drive source, and may be a hybrid automobile as long as electric vehicle 7C is chargeable.

As shown in FIG. 8, a charging station 11 is installed in a site of a building 10 which is a house of a user. Therefore, in the user's house, electric vehicle 7C can be charged by connecting the power supply coupler of charging station 11 to electric vehicle 7C parked in the site. Electric vehicle 7C includes an ECU (electronic control unit) 12 for power supply control. When power supply to an electric motor is stopped and connection of a power supply coupler is detected, ECU 12 outputs a switch instruction of a relay mode to mobile control station 30.

When the switch instruction is input, mobile control station 30 stops the antenna element directed to the inside of array antenna 31 and operates the outside-vehicle antenna element of array antenna 31. In other words, mobile control station 30 turns off the first relay mode and turns on the second relay mode (third state). In addition, mobile control station 30 sets the relay operation to the third state, and controls array antenna 31 so as to transmit the beam toward a windowpane 13 of building 10.

To be more specific, mobile control station 30 calculates the azimuth from the own station to windowpane 13 based on the position information of the own station and the position information of windowpane 13, and adjusts the directivity of array antenna 31 so that the beam transmission direction becomes the calculated azimuth. The location information of windowpane 13 can be acquired by, for example, setting input to mobile control station 30, notification from charging station 11, notification from servers such as higher-level device 1, or the like.

According to the example of use of FIG. 8, since mobile control station 30 directs the beam transmission direction of array antenna 31 to windowpane 13 during charging of electric vehicle 7C, user terminal 4 in building 10 is easily connected to the communication network. Therefore, vehicle 7 on which mobile relay station 3 is mounted can be used as a CPE for ensuring connection with user terminal 4 in building 10. Note that the beam transmission direction of array antenna 31 is not limited to windowpane 13 as long as it is directed to a portion where radio waves can easily reach indoors.

[Other Modifications] The embodiments disclosed herein are to be considered in all respects as illustrative and not restrictive. The scope of the present invention is defined by the claims, and is intended to include meanings equivalent to the claims and all modifications within the scope. For example, in the above-described embodiment, the case where vehicle 7 is an automobile that travels on a road has been exemplified. However, vehicle 7 may be a train such as a railroad or a monorail that travels along a predetermined track.

DESCRIPTION OF SYMBOLS

1 higher-level device
2 base station
3 mobile relay station
4 user terminal
5 higher-level network
6 traffic signal
7 vehicle
7A small vehicle
7B large vehicle
7C electric vehicle
8 user
9 reflector
10 building
11 charging station
13 windowpane
20 wireless control station (fixed control station)
21 antenna system (array antenna)
22 communication control unit
23 storage unit
24 wired communication unit
30 wireless control station (mobile control station)
30A wireless control station (mobile control station)
30B wireless control station (mobile control station)
31 antenna system (array antenna)
32 communication control unit
33 storage unit
40 housing
41 control unit
42 storage unit
43 communication unit
44 operating unit
45 display unit
N1 to N3 communication node

The invention claimed is:

1. A mobile relay station mounted in a vehicle, comprising:
an antenna system configured to transmit and receive a radio wave inside and outside the vehicle; and
a wireless control station configured to control directivity of the antenna system, and switch between a first relay mode and a second relay mode,
the first relay mode being a relay mode for wireless communication between a wireless communication apparatus outside the vehicle and a different wireless communication apparatus inside the vehicle,
the second relay mode being a relay mode for wireless communication between a wireless communication apparatus outside the vehicle and another wireless communication apparatus outside the vehicle,
wherein the wireless control station is configured to (i) turn on the first relay mode and turn off the second relay mode or (ii) turn off the first relay mode and turn on the second relay mode on the basis of predetermined control information, wherein the control information includes a switch instruction generated in response to charging of the vehicle, and wherein the wireless control station is configured to turn off the first relay mode and turn on the second relay mode in a case where the switch instruction is input.

2. The mobile relay station according to claim 1, wherein the control information includes a movement tendency of the vehicle, and the wireless control station is configured to turn on the first relay mode and turn off the second relay mode in a case where the movement tendency indicates traveling of the vehicle, and turn on the second relay mode in a case where the movement tendency indicates stopping of the vehicle.

3. The mobile relay station according to claim 1, wherein the control information includes an access mode of the wireless control station specified by a higher-level device in a mobile communication system, and the wireless control station is configured to turn on the first relay mode and turn off the second relay mode in a case where the access mode specified for the wireless control station is a closed subscriber group (CSG) mode, and turn on the second relay mode in a case where the access mode specified for the wireless control station is a non-CSG mode.

4. The mobile relay station according to claim 3, wherein the higher-level device is configured to determine a type of the access mode of the wireless control station on the basis of a stay indicator that is an indicator indicating whether the wireless control station is staying within a predetermined range including a current location, specify the non-CSG mode as the access mode of the wireless control station in a case where the stay indicator of the wireless control station indicates staying, and specify the CSG mode as the access mode of the wireless control station in a case where the stay indicator of the wireless control station indicates non-staying.

5. The mobile relay station according to claim 3, wherein the higher-level device is configured to specify the access mode to be applied to the wireless control station in response to reception of identification information indicating that the wireless control station is the mobile relay station.

6. The mobile relay station according to claim 1, wherein the wireless control station is configured to control the antenna system so as to transmit a beam to a part of a building through which a radio wave easily reaches an inside of the building.

7. The mobile relay station according to claim 1, wherein the wireless control station is configured to adjust, in a case where the second relay mode is executed, a transmission power value of an outside-vehicle antenna element included in the antenna system on the basis of a measurement result of a reception radio wave communicated from a neighboring station outside the vehicle.

8. The mobile relay station according to claim 7, wherein the wireless control station is configured to further adjust a transmission parameter related to a beam transmission direction of the outside-vehicle antenna element included in the antenna system.

9. The mobile relay station according to claim 2, wherein the control information includes an access mode of the wireless control station specified by a higher-level device in a mobile communication system, and the wireless control station is configured to turn on the first relay mode and turn off the second relay mode in a case where the access mode specified for the wireless control station is a closed subscriber group (CSG) mode, and turn on the second relay mode in a case where the access mode specified for the wireless control station is a non-CSG mode.

10. The mobile relay station according to claim 4, wherein the higher-level device is configured to specify the access mode to be applied to the wireless control station in response to reception of identification information indicating that the wireless control station is the mobile relay station.

11. The mobile relay station according to claim 2, wherein the wireless control station is configured to adjust, in a case where the second relay mode is executed, a transmission power value of an outside-vehicle antenna element included in the antenna system on the basis of a measurement result of a reception radio wave communicated from a neighboring station outside the vehicle.

12. The mobile relay station according to claim 3, wherein the wireless control station is configured to adjust, in a case where the second relay mode is executed, a transmission power value of an outside-vehicle antenna element included in the antenna system on the basis of a measurement result of a reception radio wave communicated from a neighboring station outside the vehicle.

13. The mobile relay station according to claim 4, wherein the wireless control station is configured to adjust, in a case where the second relay mode is executed, a transmission power value of an outside-vehicle antenna element included in the antenna system on the basis of a measurement result of a reception radio wave communicated from a neighboring station outside the vehicle.

14. A mobile communication system comprising:

a higher-level device;

a base station configured to communicate with the higher-level device; and a mobile relay station mounted in a vehicle configured to wirelessly communicate with the base station, wherein the mobile relay station comprises an antenna system configured to transmit and receiving receive a radio wave inside and outside the vehicle; and a wireless control station configured to control directivity of the antenna system, and switch between a first relay mode and a second relay mode, the first relay mode being a relay mode for wireless communication between a wireless communication apparatus outside the vehicle and a different wireless communication apparatus inside the vehicle, the second relay mode being a relay mode for wireless communication between a wireless communication apparatus outside the vehicle and another wireless communication apparatus outside the vehicle, and wherein the wireless control station is configured to (i) turn on the first relay mode and turn off the second relay mode or (ii) turn off the first relay mode and turn on the second relay mode on the basis of predetermined control information, wherein the control information includes a switch instruction generated in response to charging of the vehicle, and wherein the wireless control station is configured to turn off the first relay mode and turn on the second relay mode in a case where the switch instruction is input.

15. A control method of a mobile relay station mounted in a vehicle, the control method comprising:

obtaining predetermined control information, by a wireless control station, wherein the wireless control station is configured to control directivity of an antenna system and switch between a first relay mode and a second relay mode, wherein the antenna system is configured to transmit and receive a radio wave inside and outside the vehicle, and wherein the first relay mode is a relay mode for wireless communication between a wireless communication apparatus outside the vehicle and a different wireless communication apparatus inside the vehicle, and the second relay mode is a relay mode for wireless communication between a wireless communication apparatus outside the vehicle and another wireless communication apparatus outside the vehicle; and (i) turning on the first relay mode and turning off the second relay mode or (ii) turning off the first relay mode and turning on the second relay mode on the basis of the obtained control information, by the wireless control station, wherein the control information includes a switch instruction generated in response to charging of the vehicle, and wherein the control method further includes turning off the first relay mode and turning on the second relay mode in a case where the switch instruction is input.

* * * * *